(12) United States Patent
Kimes et al.

(10) Patent No.: US 10,933,736 B1
(45) Date of Patent: Mar. 2, 2021

(54) DRIVE SYSTEM INCLUDING A TRANSMISSION HAVING A PLURALITY OF DIFFERENT OPERATING MODES

(71) Applicant: Means Industries, Inc., Saginaw, MI (US)

(72) Inventors: John W. Kimes, Wayne, MI (US); Philip B. Woodley, Chicago, IL (US)

(73) Assignee: Means Industries, Inc., Saginaw, MI (US)

( * ) Notice: Subject to any disclaimer, the term of this patent is extended or adjusted under 35 U.S.C. 154(b) by 13 days.

(21) Appl. No.: 16/683,412

(22) Filed: Nov. 14, 2019

(51) Int. Cl.
| | |
|---|---|
| *B60K 6/54* | (2007.10) |
| *B60K 6/365* | (2007.10) |
| *F16H 3/00* | (2006.01) |
| *F16H 61/66* | (2006.01) |
| *F16H 57/02* | (2012.01) |

(52) U.S. Cl.
CPC ............... *B60K 6/54* (2013.01); *B60K 6/365* (2013.01); *F16H 3/005* (2013.01); *F16H 2057/02034* (2013.01); *F16H 2061/661* (2013.01); *F16H 2061/6603* (2013.01); *F16H 2200/2005* (2013.01)

(58) Field of Classification Search
None
See application file for complete search history.

(56) References Cited

U.S. PATENT DOCUMENTS

| | | | |
|---|---|---|---|
| 5,847,469 A | 12/1998 | Tabata et al. | |
| 5,856,709 A | 1/1999 | Ibaraki et al. | |
| 5,934,395 A | 8/1999 | Koide et al. | |
| 6,019,699 A | 2/2000 | Hoshiya et al. | |
| 6,306,057 B1 | 10/2001 | Morisawa et al. | |
| 6,344,008 B1 | 2/2002 | Nagano et al. | |
| 7,172,525 B2 * | 2/2007 | Sowul | F16H 3/728 475/5 |
| 7,174,979 B2 * | 2/2007 | Ohta | B60K 6/543 180/65.25 |
| 7,201,690 B2 | 4/2007 | Miura et al. | |

(Continued)

OTHER PUBLICATIONS

Howard L. Benford and Maurice B. Leising, The lever Analogy: A New Tool in Transmission Analysis, Chrysler Corporation, Downloaded from SAE International by Robert Tuttle, Tuesday, Apr. 5, 2016.

*Primary Examiner* — Dirk Wright
(74) *Attorney, Agent, or Firm* — Brooks Kushman P.C.

(57) ABSTRACT

A drive system having eCVT functionality with AMT cost advantages includes a transmission having a plurality of different operating modes. The system includes a transmission output shaft, a stationary member and a gear set including first, second, and third elements. The first element connects with the transmission output shaft. An output shaft of a non-electric power plant connects with the first element through the second element for driving the first element. A drive shaft of an electric power plant connects with the first element through the third element for driving the first element. The system includes a plurality of non-friction, controllable, coupling assemblies. A first coupling assembly has a first coupling state for grounding the second element to the stationary member, a second coupling state for grounding the third element to the stationary member and an uncoupling state to allow the second and third elements to drive the first element.

20 Claims, 9 Drawing Sheets

(56) References Cited

U.S. PATENT DOCUMENTS

| | | | | |
|---|---|---|---|---|
| 7,220,202 | B2 * | 5/2007 | Singh | B60K 6/365 475/5 |
| 7,223,200 | B2 | 5/2007 | Kojima et al. | |
| 7,237,634 | B2 | 7/2007 | Severinsky et al. | |
| 7,255,186 | B2 | 8/2007 | Wakuta et al. | |
| 7,256,510 | B2 * | 8/2007 | Holmes | B60W 10/08 290/45 |
| 7,393,296 | B2 | 7/2008 | Kano et al. | |
| 7,397,296 | B1 | 7/2008 | Kiani | |
| 7,426,971 | B2 | 9/2008 | Kano et al. | |
| 7,614,466 | B2 | 11/2009 | Kano et al. | |
| 7,621,359 | B2 | 11/2009 | Kano et al. | |
| 7,633,247 | B2 | 12/2009 | Obayashi | |
| 7,690,455 | B2 | 4/2010 | Kano et al. | |
| 7,699,735 | B2 * | 4/2010 | Conlon | B60K 6/48 475/5 |
| 7,942,781 | B2 | 5/2011 | Kimes | |
| 8,033,939 | B2 * | 10/2011 | Tabata | B60K 6/365 475/5 |
| 8,167,754 | B2 * | 5/2012 | Phillips | B60K 6/365 475/5 |
| 8,226,515 | B2 * | 7/2012 | Phillips | B60K 6/445 475/5 |
| 8,246,501 | B2 * | 8/2012 | Phillips | F16H 3/728 475/5 |
| 8,251,850 | B2 | 8/2012 | Phillips | |
| 8,398,514 | B2 * | 3/2013 | Phillips | F16H 3/728 475/5 |
| 8,641,573 | B2 * | 2/2014 | Ideshio | B60W 10/06 475/218 |
| 8,813,929 | B2 | 8/2014 | Kimes | |
| 8,888,637 | B2 * | 11/2014 | Kimes | F16H 3/728 475/5 |
| 9,109,636 | B2 | 8/2015 | Kimes et al. | |
| 9,186,977 | B2 * | 11/2015 | Kimes | B60K 6/445 |
| 9,303,699 | B2 | 4/2016 | Kimes et al. | |
| 9,441,708 | B2 * | 9/2016 | Kimes | B60K 6/365 |
| 9,933,049 | B2 * | 4/2018 | Kimes | F16H 3/728 |
| 10,131,220 | B2 * | 11/2018 | Kum | B60K 6/445 |
| 10,183,570 | B2 * | 1/2019 | Kimes | B60K 6/365 |
| 10,821,823 | B2 * | 11/2020 | Kimes | B60K 6/547 |
| 2011/0177900 | A1 * | 7/2011 | Simon | F16H 1/28 475/5 |
| 2014/0100071 | A1 | 4/2014 | Kimes | |
| 2015/0000442 | A1 | 1/2015 | Kimes et al. | |
| 2015/0014116 | A1 | 1/2015 | Kimes et al. | |
| 2017/0313173 | A1 | 11/2017 | Kimes et al. | |
| 2018/0106304 | A1 | 4/2018 | Kimes et al. | |
| 2018/0156332 | A1 | 6/2018 | Kimes et al. | |
| 2018/0231105 | A1 | 8/2018 | Kimes et al. | |
| 2019/0225073 | A1 | 7/2019 | Kimes et al. | |

* cited by examiner

PHEV Powertrain

| Mode | | State | 1-2 Three Position DCC | | 3-4 Three Position DCC | | Three Position DCC for Mode Selection | | | Optional Brake |
|---|---|---|---|---|---|---|---|---|---|---|
| | | | 1 | 2 | 3 | 4 | EV | HEV | GAS | Park/HH /Serial |
| EV Mode | | 1st/Rev | X | | | | X | | | |
| | | 2nd | | X | | | X | | | |
| | | 3rd | | | X | | X | | | |
| | | 4th | | | | X | X | | | |
| | | Hill Hold | X | | | | X | | | 1/2 |
| Hybrid Mode- Power Split | | ECVT1 | X | | | | | X | | |
| | | ECVT2 | | X | | | | X | | |
| | | ECVT3 | | | X | | | X | | |
| | | ECVT4 | | | | X | | X | | |
| Serial Hyb | | Fwd/Rev | | | | | | X | | X |
| Stationary | | Park/Power Generation | X | | | | | X | | X |
| ICE | | 1st | X | | | | | | X | |
| | | 2nd | | X | | | | | X | |
| | | 3rd | | | X | | | | X | |
| | | 4th | | | | X | | | X | |

FIG. 9

DRIVE SYSTEM INCLUDING A TRANSMISSION HAVING A PLURALITY OF DIFFERENT OPERATING MODES

TECHNICAL FIELD

This invention relates to drive systems or powertrains including transmissions for electric and hybrid electric vehicles.

OVERVIEW

A battery electric vehicle (BEV) is a type of electric vehicle (EV) that uses chemical energy stored in rechargeable battery packs. BEVs use electric motors and motor controllers instead of internal combustion engines (ICEs) for propulsion.

As described in U.S. Pat. Nos. 8,167,754; 8,226,515; 8,246,501; 8,251,850; and 8,398,514, to produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

Other U.S. patents which describe hybrid transmissions or power trains include: U.S. Pat. Nos. 5,847,469; 5,856,709; 5,934,395; 6,019,699; 6,306,057; 6,344,008; 7,201,690; 7,223,200; 7,237,634; 7,255,186; 7,393,296; 7,397,296; 7,426,971; 7,614,466; 7,621,359; 7,633,247; and 7,690,455.

U.S. patent documents assigned to the same assignee as the present application and which are related to the present application include U.S. Pat. Nos. 8,813,929; 8,888,637; 9,109,636, 9,186,977; 9,303,699; and 9,441,708 and U.S. published applications 2014/0100071; 2015/0000442; 2015/0014116; 2018/0106304; 2018/0231105; and 2017/0313173. The disclosures of all of the above-noted, commonly assigned patent documents are hereby incorporated in their entirety by reference herein.

Some of the above related patent documents assigned to the assignee of the present application disclose a 2-position, linear motor eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442 and U.S. Pat. No. 9,441,708 disclose three-position, linear motor, magnetically-latching, 2-way CMDs.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

A multiple-ratio (i.e., step-ratio) automatic transmission in an automotive vehicle powertrain adjusts a gear ratio between a torque source and a driveshaft to meet drivability requirements under dynamically-changing driving conditions. Ratio changes are achieved by engaging a so-called "on-coming clutch" ("OCC") as a so-called "off-going clutch" ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control.

The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

An automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels, traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain.

The problem with this approach is that during the torque interruption, the driver is lunged forward in the cab and then lunged backwards when the engine hooks back up with the drivetrain. This shift event can be as long as a second. It is an undesirable "shift feel". Also the vehicle has no acceleration during this transition leading to undesirable driving situations (pulling out into traffic, merging, etc.).

U.S. Pat. No. 7,942,781 discloses a high-efficiency vehicular transmission. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

For purposes of this application, the term "coupling" should be interpreted to include clutches or brakes wherein one of the plates is drivably connected to a torque delivery element of a transmission and the other plates is drivably connected to another torque delivery element or is anchored and held stationary with respect to a transmission housing. The terms "coupling", "clutch" and "brake" may be used interchangeably.

U.S. Published Patent Application No. 2018/0156332 discloses drive systems or powertrains including transmissions for electric and hybrid electric vehicles. A 3-position linear motor, 2-way clutches (i.e., CMDs) are included in the transmissions. An electric 3-speed AMT is disclosed.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open loop operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

U.S. Published Patent Application No. 2019/0225073 discloses a powertrain assembly for a vehicle includes a first motor and a second motor. A power split assembly, having an output power shaft, is connected to both the first and second motors to the power output shaft. The power split assembly selectively receives power output from the first and second motors, wherein the power split assembly defines a plurality of modes of operation to provide torque to the output power shaft. The powertrain assembly also includes a bypass power shaft operatively connected between the second motor and the output power shaft, such that the second motor provides torque to the output power shaft using the bypass power shaft.

eCVT functionality improves transmission efficiency and is typically provided by a dedicated hybrid transmission (DHT) instead of an AMT. The AMT is typically preferred for cost reasons in that the AMT of U.S. patent document 2018/0156332 has a single actuator (i.e. a three-position linear actuator).

SUMMARY OF EXAMPLE EMBODIMENTS

An object of at least one embodiment of the present invention is to provide a drive system including a transmission having a plurality of different operating modes wherein eCVT functionality is provided for efficiency together with AMT cost advantages.

In carrying out the above objects and other objects of at least one embodiment of the present invention, a drive system including a transmission having a plurality of different operating modes is provided. The system includes a transmission output shaft, a stationary member and a gear set including first, second, and third elements. The first element connects with the transmission output shaft. An output shaft of a non-electric power plant connects with the first element through the second element for driving the first element. A drive shaft of an electric power plant connects with the first element through the third element for driving the first element. A non-friction, controllable, first coupling assembly has a first coupling state for grounding the second element to the stationary member, a second coupling state for grounding the third element to the stationary member and an uncoupling state to allow the second and third elements to drive the first element. The first coupling assembly is non-hydraulically controlled to change state. A group of gears including fourth and fifth elements connects with the transmission output shaft. A non-friction, controllable, second coupling assembly has a first coupling state for coupling the fourth element to the transmission output shaft, a second coupling state for coupling the fifth element to the transmission output shaft, and an uncoupling state for uncoupling the transmission output shaft from the fourth and fifth elements. The second coupling assembly is non-hydraulically controlled to change state.

The gear set may be a planetary gear set wherein the first, second and third elements comprise a ring gear, a carrier and a sun gear, respectively.

The system may further include a non-friction, controllable brake assembly to allow for park and hill hold in the first coupling state of the second coupling assembly.

The non-electric power plant may comprise an internal combustion engine.

The electric power plant may be an electric motor.

The first coupling assembly may comprise a three-position linear actuator and a pair of clutches wherein the actuator controls the pair of clutches.

The second coupling assembly may comprise a three-position linear actuator and a pair of clutches wherein the actuator controls the pair of clutches.

The modes may comprise an EV mode, a hybrid mode and an ICE mode.

The hybrid mode may have a plurality of CVT states when the first coupling assembly is in its uncoupling state.

The transmission may be an automatic manual transmission (AMT).

Further in carrying out the above object and other objects of at least one embodiment of the present invention, a drive system including a transmission having a plurality of different operating modes is provided. The system includes a transmission output shaft, a stationary member and a gear set including first, second, and third elements. The first element connects with the transmission output shaft. An output shaft of a non-electric power plant connects with the first element through the second element for driving the first element. A drive shaft of an electric power plant connects with the first element through the third element for driving the first element. A non-friction, controllable, first coupling assembly has a first coupling state for grounding the second element to the stationary member, a second coupling state for grounding the third element to the stationary member and an uncoupling state to allow the second and third elements to drive the first element. The first coupling assembly is non-hydraulically controlled to change state. A group of gears includes fourth, fifth, six and seventh elements connecting with the transmission output shaft. A non-friction, controllable, second coupling assembly has a first coupling state for coupling the fourth element to the transmission output shaft, a second coupling state for coupling the fifth element to the transmission output shaft, and an uncoupling state for uncoupling the transmission output shaft from the fourth and fifth elements. The second coupling assembly is non-hydraulically controlled to change state. A non-friction, controllable, third coupling assembly has a first coupling state for coupling the sixth element to the transmission output shaft, a second coupling state for coupling the seventh element to the transmission output shaft, and an uncoupling state for uncoupling the transmission output shaft from the sixth and seventh elements. The third coupling assembly is non-hydraulically controlled to change state.

The third coupling assembly may comprise a three-position linear actuator and a pair of clutches wherein the actuator controls the pair of clutches.

BRIEF DESCRIPTION OF THE DRAWINGS

FIG. 9 is a chart which shows various operating modes and states of the drive system of FIGS. 1-8 and corresponding states of the components of the system to achieve these operating modes and states.

DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
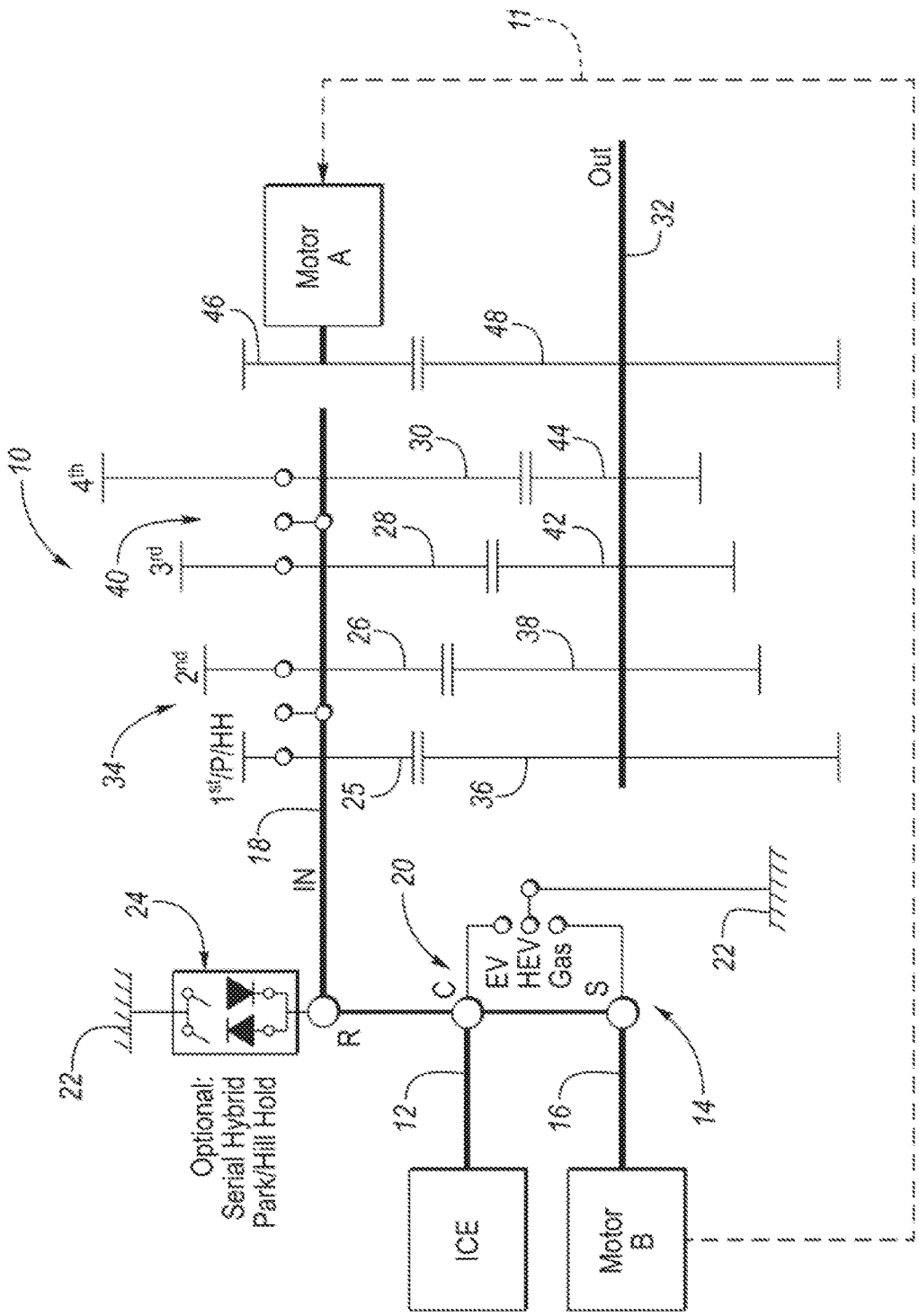
FIG. 1 is a schematic block diagram of a drive system including a transmission for a PHEV/BEV vehicle and connected in accordance with at least one embodiment of the present invention.
Figure 2:
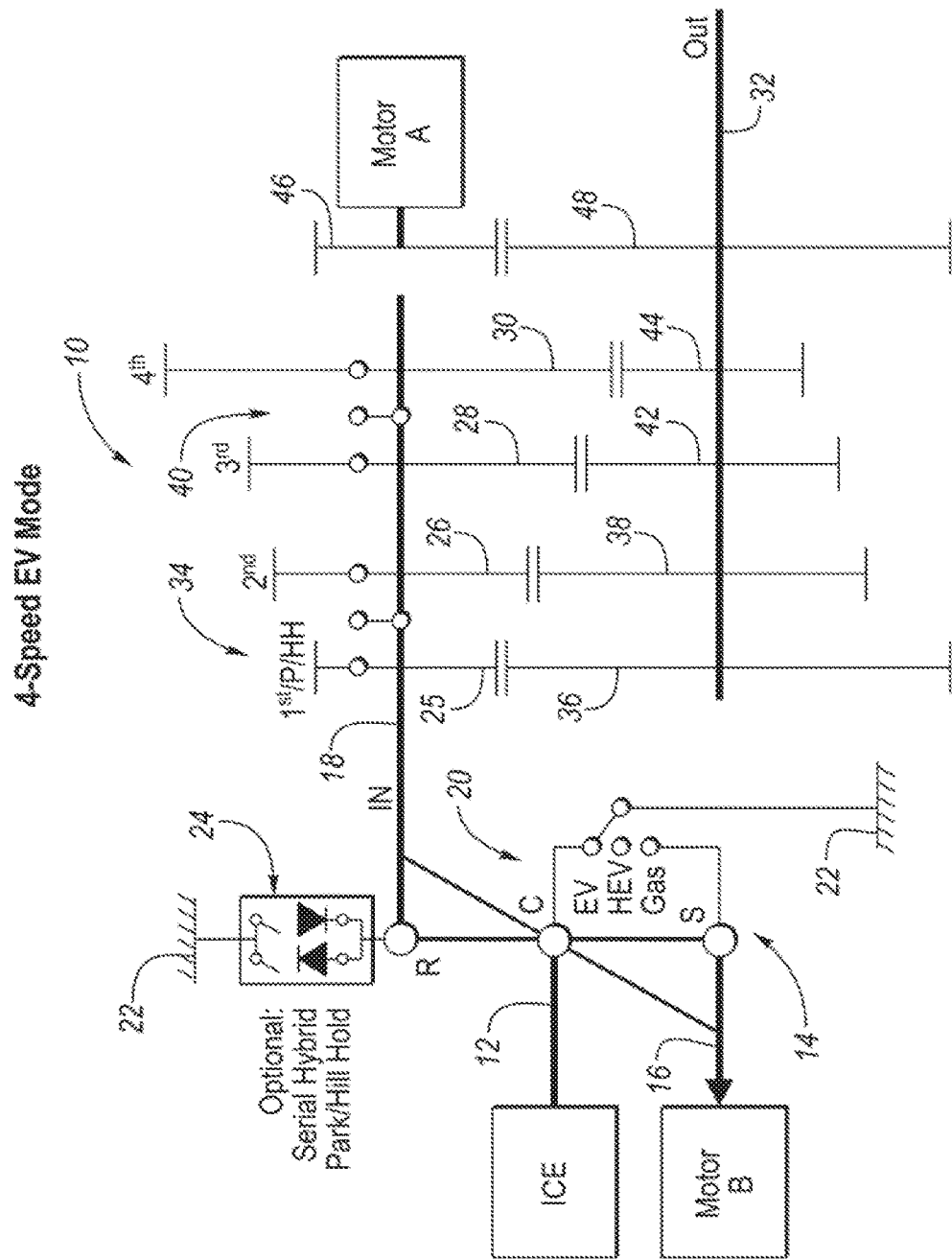
FIG. 2 is a diagram similar to the diagram of FIG. 1, but also including a lever diagram showing the system in a 4-speed EV mode.
Figure 3:
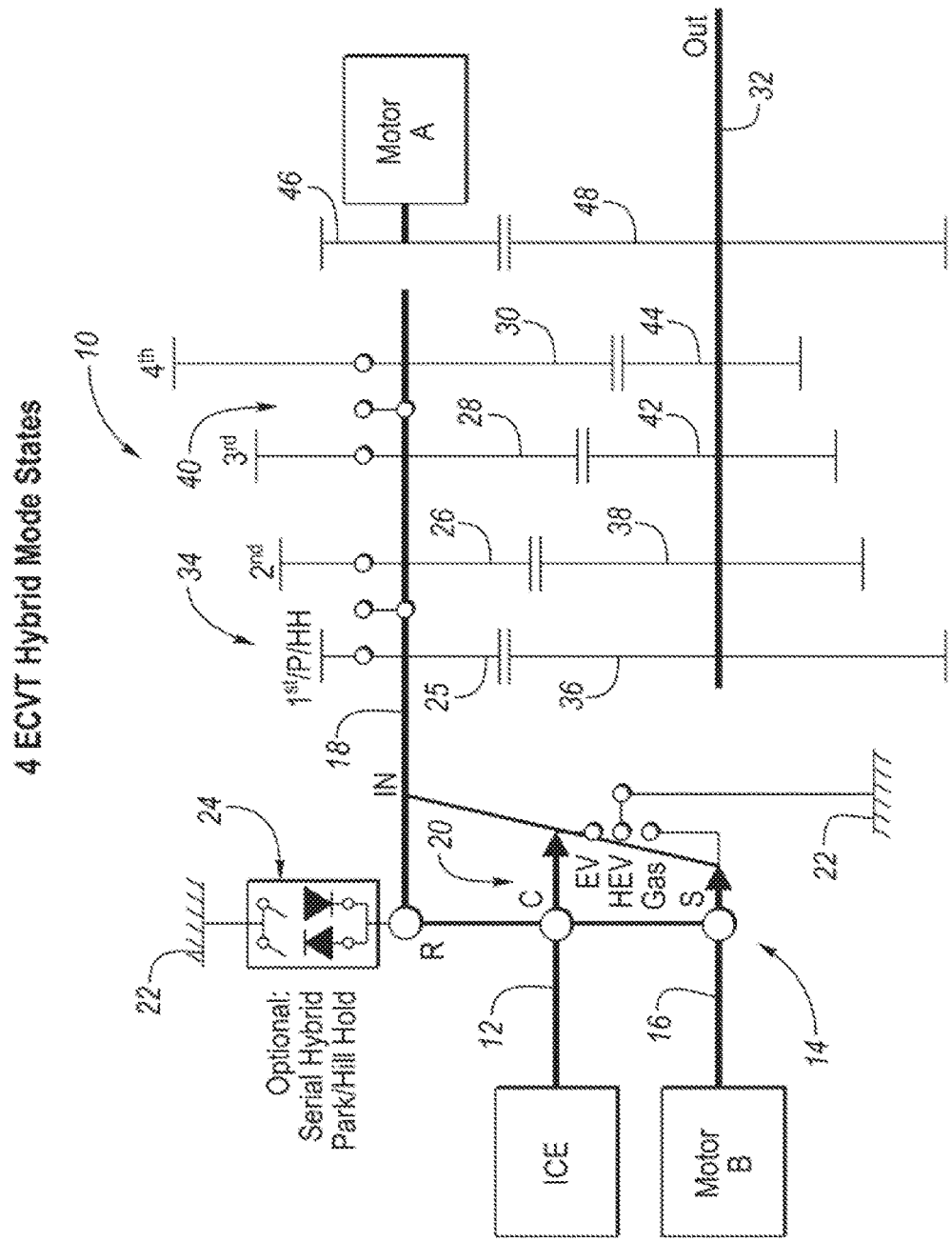
FIG. 3 is a diagram similar to the diagrams of FIGS. 1 and 2, but also including a lever diagram showing the system in 4 ECVT hybrid mode states.
Figure 4:
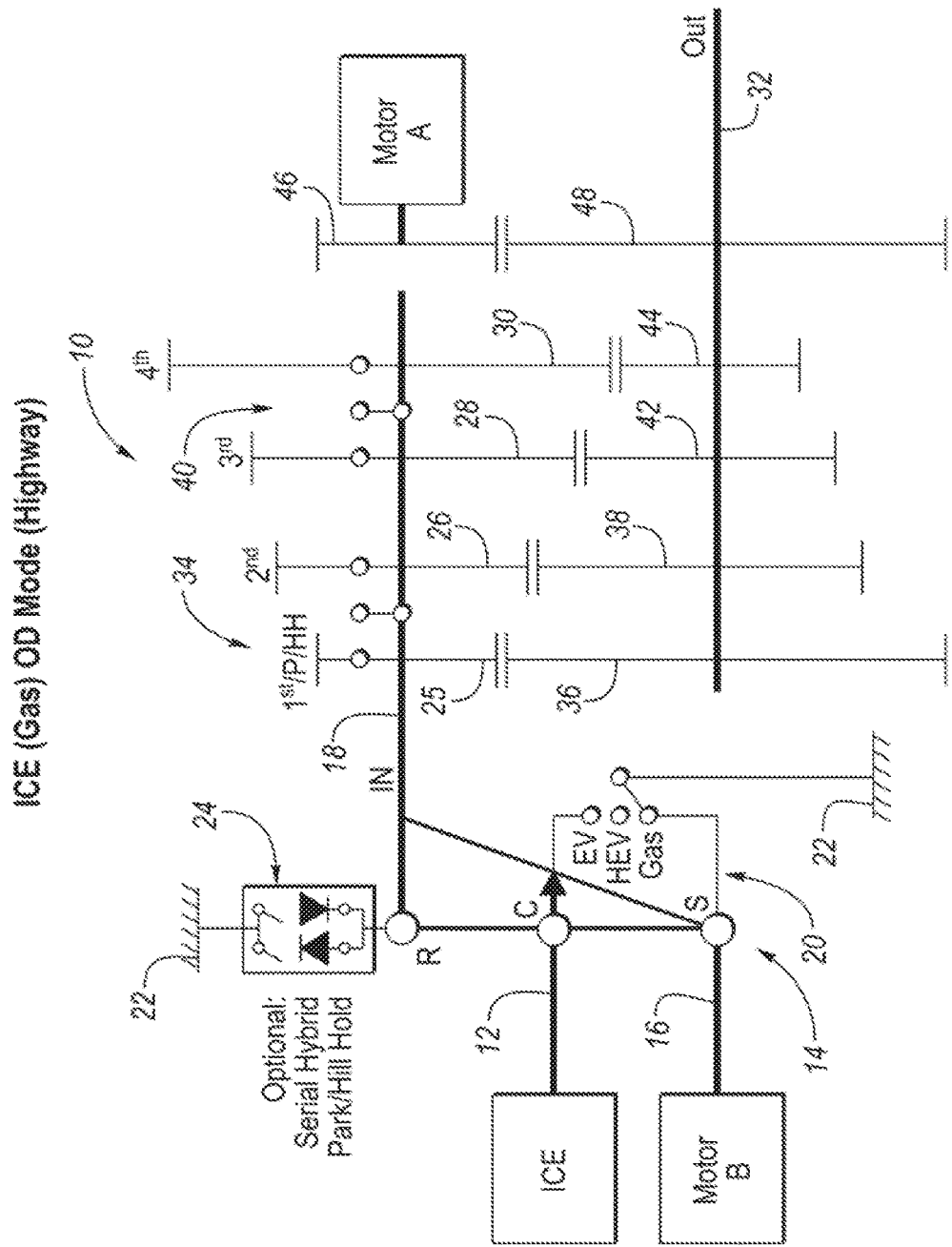
FIG. 4 is a diagram similar to the diagrams of FIGS. 1-3, but also including a lever diagram showing the system in an ICE (Gas) OD mode (for highspeed-highway use)
Figure 5:
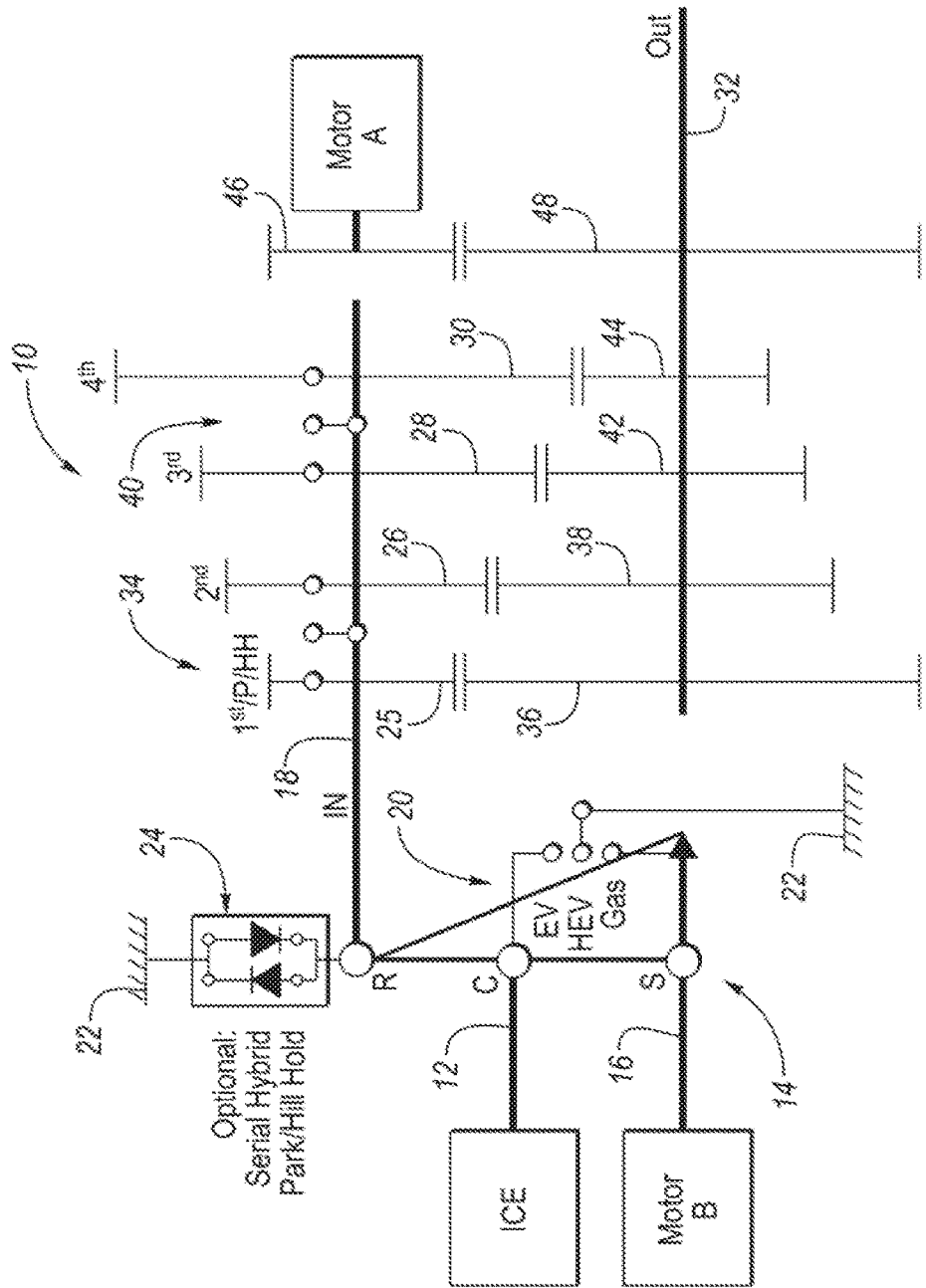
FIG. 5 is a diagram similar to the diagrams of FIGS. 1-4, but also including a lever diagram showing the system in a serial hybrid mode—gas powered reverse.
Figure 6:
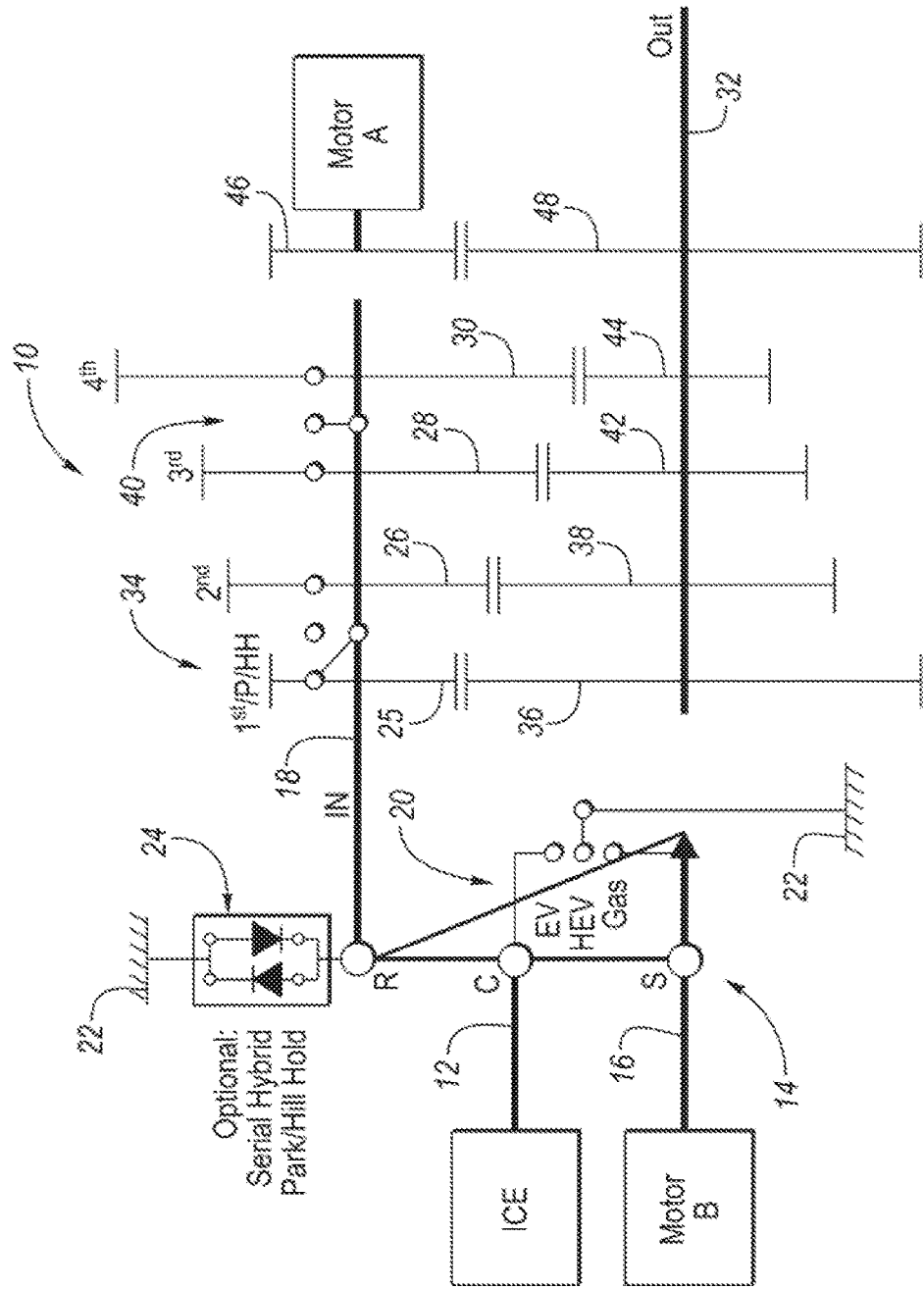
FIG. 6 is a diagram similar to the diagrams of FIGS. 1-5, but also including a lever diagram showing the system in a different serial hybrid mode—stationary power generation.
Figure 7:
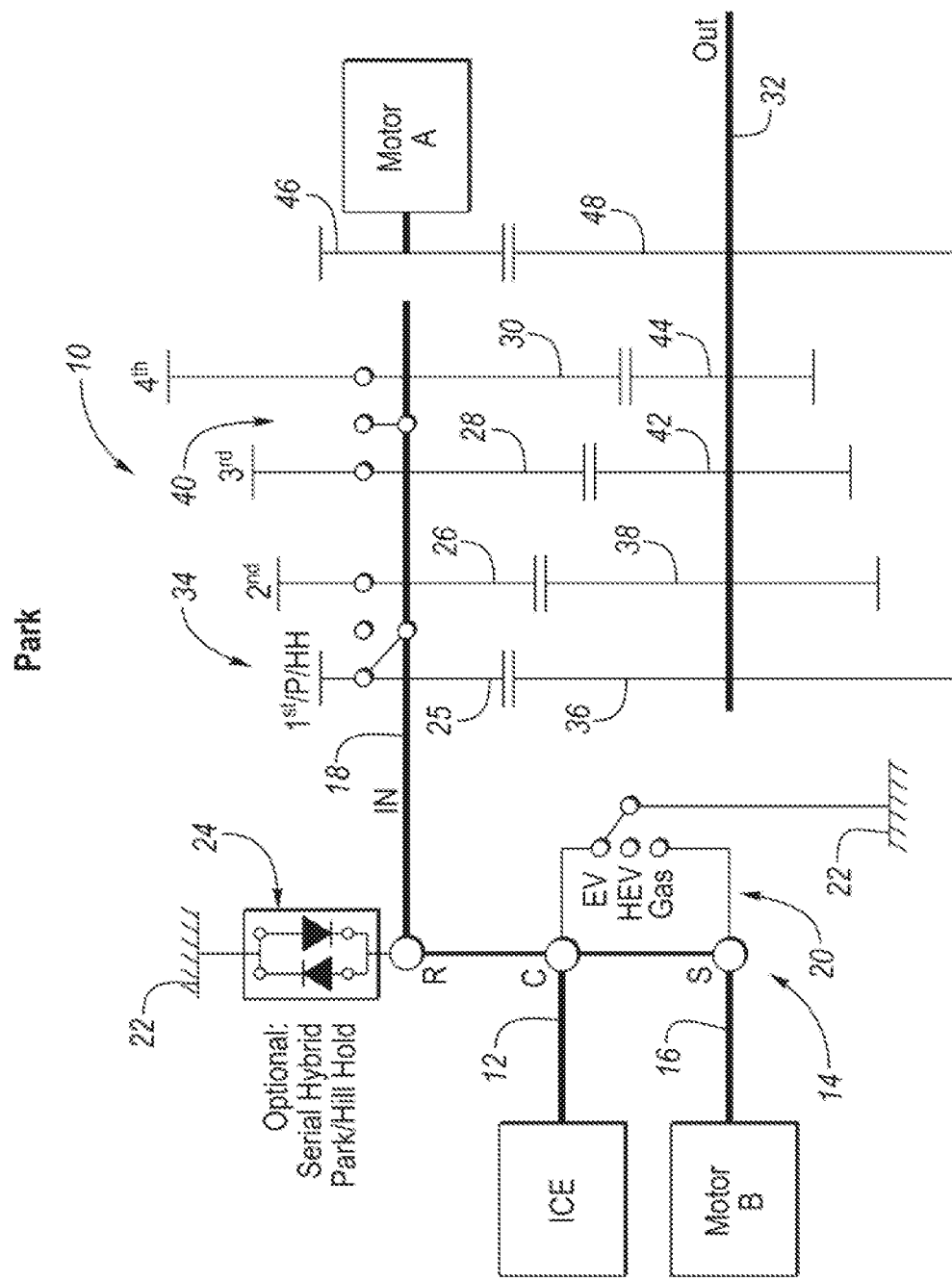
FIG. 7 is a diagram similar to the diagrams of FIGS. 1-6, but showing the system in park.
Figure 8:
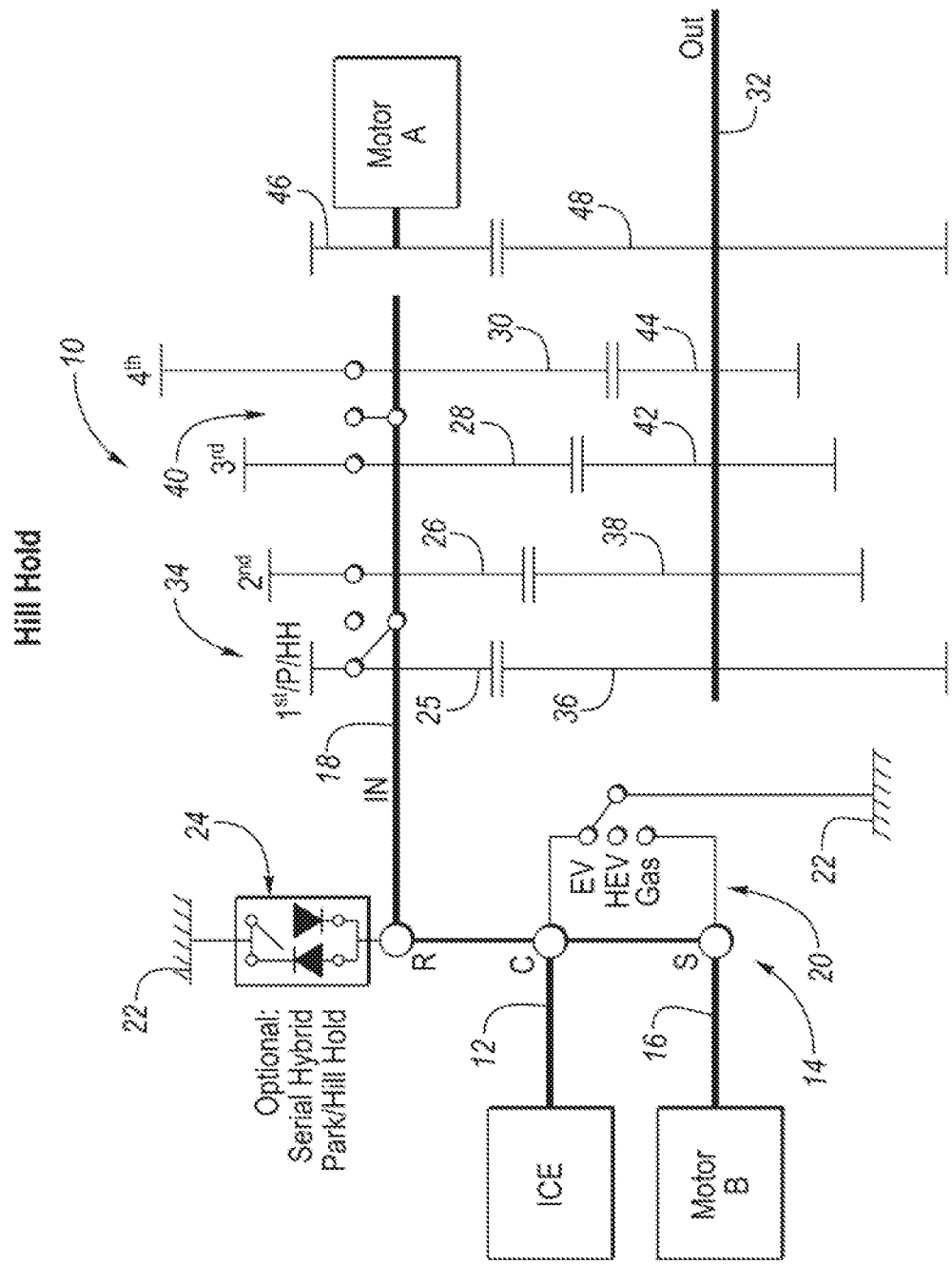
FIG. 8 is a diagram similar to the diagrams of FIGS. 1-7, but showing the system in hill hold.

FIGS. 1-8 are schematic block diagrams of a drive system including a transmission, generally indicated at 10, for a PHEV/BEV. The power split transmission 10 has a plurality of different operating modes including EV mode, hybrid mode, ICE mode (i.e. gas mode), serial hybrid mode and stationary mode as shown in the chart of FIG. 9. The EV mode, the hybrid mode and the ICE mode each have a plurality of operating states.

The transmission 10 includes a "motor A" and a "motor B" both of which are electric motors having a rotor and a stator. An electric path 11 is provided between the motors as is well known in the art. Typically both motors operate in EV mode.

A non-electric power plant, such as an internal combustion engine (ICE), has a rotary output shaft 12 connected to a carrier (C) of a simple planetary gear set, generally included at 14. The motor B has a rotary output shaft 16 connected to a sun gear (S) of the gear set 14. The gear set 14 also includes a ring gear (R). The ring gear R is fixedly connected to a rotary input shaft 18 of the transmission 10. In general, the gear set 14 provides or enables the transmission 10 to have a plurality of different power split/ECVT states, as indicated in the chart of FIG. 9.

The transmission 10 also includes a non-friction, electronically controllable, first coupling assembly, generally indicated at 20, in the form of a three-position DCC (i.e. dynamic controllable clutch for mode selection—see the chart of FIG. 9) which includes a three-position linear actuator (i.e. stepper motor) which controls two clutches. Such DCCs are generally available from Means Industries of Saginaw, Mich. A preferred 3-position linear stepper motor is described in U.S. Published Patent Application No. 2018/0156332 which is hereby incorporated in its entirety by reference herein.

A first position of the linear motor is indicated by a node labeled "EV", a second position of the linear motor is indicated a node labeled "HEV" and the third position of the linear motor is indicated by a node labeled "GAS." In FIG.

1, the node "HEV" is grounded to a stationary member 22 of the transmission 10 such as a transmission housing.

An optional non-friction, electronically controllable brake assembly, generally indicated at 24 (i.e. optional brake of the chart of FIG. 9), allows for park and hill hold (HH) as indicated in the chart of FIG. 9. Preferably, the brake assembly 24 includes a pair of electronically controllable solenoids. A preferred brake assembly 24 is described in numerous patent documents noted herein and is generally available from Means Industries.

The transmission 10 also includes a group of gears including fourth, fifth, six and seventh elements such as gears 25, 26, 28 and 30, respectively, connecting with a transmission output shaft 32. The gears 25, 26, 28 and 30 are mounted for rotation with the input shaft 18.

The transmission 10 also includes a non-friction, electronically controllable, second coupling assembly, generally indicated at 34, (i.e. 1-2 three position DCC of the chart of FIG. 9) having a first coupling state for coupling the fourth element 25 to the transmission output shaft 32 via a gear 36, a second coupling state for coupling the fifth element 26 to the transmission output shaft 32 via a gear 38, and an uncoupling state for uncoupling the transmission output shaft 32 from the fourth and fifth elements, 25 and 26, respectively. The second coupling assembly 34 is non-hydraulically controlled to change state and is substantially identical to the first coupling assembly 20 in that the second coupling assembly preferably comprises a three-position linear actuator and a pair of clutches. As with the first coupling assembly 20, the actuator of the second coupling assembly 34 controls the pair of clutches.

The transmission 10 further includes a non-friction, electronically controllable, third coupling assembly, generally indicated at 40 (i.e. 3-4 three position DCC of the chart of FIG. 9), having a first coupling state for coupling the sixth element 28 to the transmission output shaft 32 via a gear 42, a second coupling state for coupling the seventh element 30 to the transmission output shaft 32 via a gear 44, and an uncoupling state for uncoupling the transmission output shaft 32 from the sixth and seventh elements 28 and 30, respectively. The third coupling assembly 40 is non-hydraulically controlled to change state. The gears 36, 38, 42 and 44 are mounted for rotation with the output shaft 32.

As with the first and second coupling assemblies 20 and 34, respectively, the third coupling assembly 40 preferably comprises a three-position linear actuator and a pair of clutches. The actuator controls the pair of clutches. In general, and as described in U.S. Pat. No. 9,874,252, each linear motor controls the operating mode of a pair of coupling apparatus, each of which has drive and driven members supported for rotation relative to one another about a common rotational axis of an output shaft. Each drive member may be a pocket plate and the driven member may be a notch plate. Each coupling apparatus or assembly may include two or more struts for selectively mechanically coupling the members of each coupling assembly together and change the operating mode of each coupling assembly. Preferably, the struts are spaced at 90° and/or 180° intervals about the axis.

Motor A drives the output shaft 32 through gears 46 and 48. Using two electric motors instead of a single electric motor allows for smaller electric motors and lower power requirements for a given electric motor without any detriment to towing and performance.

Each embodiment of the drive system or powertrain constructed in accordance with the invention may utilize a main controller or TECU (transmission electronic control unit) (not shown) and one or more controllers (not shown).

In general, the TECU provides and regulates the power to drive the various rotary and linear motors through the one or more controllers. Each controller typically has a microcontroller (i.e. MCU) including circuitry. Each controller typically receives command signals from the remote electronic control unit (TECU) over or through a vehicle-based bus.

Preferably, control logic used by the TECU and/or the controller is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like.

The TECU and the one or more controllers are connected via a vehicle bus such as a local interconnect network (LIN or CAN) line or bus capable of two-way communications. LIN is one of many possible in-vehicle local area network (LAN) communications protocols. A power line and a ground line may be provided between the TECU and each controller. Each controller typically includes a transceiver interface within the MCU, a microprocessor and its control logic within the MCU, and a motor drive or driver, and an electrical power source. Each controller may be integrated or physically coupled within the transmission housing, while the TECU is provided some distance away from the housing.

The MCU of each motor controller typically includes a memory and may be configured as a conventional microcomputer including a CPU, a ROM, a RAM and the like or as a hardwired logic circuit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive system including a transmission having a plurality of different operating modes, the system comprising:
    a transmission output shaft;
    a stationary member;
    a gear set including first, second, and third elements, the first element connecting with the transmission output shaft, an output shaft of a non-electric power plant connecting with the first element through the second element for driving the first element and a drive shaft of an electric power plant connecting with the first element through the third element for driving the first element;
    a non-friction, controllable, first coupling assembly having a first coupling state for grounding the second element to the stationary member, a second coupling state for grounding the third element to the stationary member and an uncoupling state to allow the second and third elements to drive the first element, the first coupling assembly being non-hydraulically controlled to change state;
a group of gears including fourth and fifth elements connecting with the transmission output shaft; and
a non-friction, controllable, second coupling assembly having a first coupling state for coupling the fourth element to the transmission output shaft, a second coupling state for coupling the fifth element to the transmission output shaft, and an uncoupling state for uncoupling the transmission output shaft from the fourth and fifth elements, the second coupling assembly being non-hydraulically controlled to change state.

2. The system as claimed in claim 1, wherein the gear set is a planetary gear set and wherein the first, second and third elements comprise a ring gear, a carrier and a sun gear, respectively.

3. The system as claimed in claim 1, further comprising a non-friction, controllable, brake assembly to allow for park and hill hold in the first coupling state of the second coupling assembly.

4. The system as claimed in claim 1, wherein the non-electric power plant comprises an internal combustion engine.

5. The system as claimed in claim 1, wherein the electric power plant is an electric motor.

6. The system as claimed in claim 1, wherein the first coupling assembly comprises a three-position linear actuator and a pair of clutches and wherein the actuator controls the pair of clutches.

7. The system as claimed in claim 1, wherein the second coupling assembly comprises a three-position linear actuator and a pair of clutches and wherein the actuator controls the pair of clutches.

8. The system as claimed in claim 1, wherein the modes comprise an EV mode, a hybrid mode and an ICE mode.

9. The system as claimed in claim 8, wherein the hybrid mode has a plurality of CVT states when the first coupling assembly is in its uncoupling state.

10. The system as claimed in claim 1, wherein the transmission is an automatic manual transmission (AMT).

11. A drive system including a transmission having a plurality of different operating modes, the system comprising:
a transmission output shaft;
a stationary member;
a gear set including first, second, and third elements, the first element connecting with the transmission output shaft, an output shaft of a non-electric power plant connecting with the first element through the second element for driving the first element and a drive shaft of an electric power plant connecting with the first element through the third element for driving the first element;
a non-friction, controllable, first coupling assembly having a first coupling state for grounding the second element to the stationary member, a second coupling state for grounding the third element to the stationary member and an uncoupling state to allow the second and third elements to drive the first element, the first coupling assembly being non-hydraulically controlled to change state;
a group of gears including fourth, fifth, six and seventh elements connecting with the transmission output shaft;
a non-friction, controllable, second coupling assembly having a first coupling state for coupling the fourth element to the transmission output shaft, a second coupling state for coupling the fifth element to the transmission output shaft, and an uncoupling state for uncoupling the transmission output shaft from the fourth and fifth elements, the second coupling assembly being non-hydraulically controlled to change state; and
a non-friction, controllable, third coupling assembly having a first coupling state for coupling the sixth element to the transmission output shaft, a second coupling state for coupling the seventh element to the transmission output shaft, and an uncoupling state for uncoupling the transmission output shaft from the sixth and seventh elements, the third coupling assembly being non-hydraulically controlled to change state.

12. The system as claimed in claim 11, wherein the gear set is a planetary gear set and wherein the first, second and third elements comprise a ring gear, a carrier and a sun gear, respectively.

13. The system as claimed in claim 11 further comprising a non-friction, controllable, brake assembly to allow for park and hill hold in the first coupling state of the second coupling assembly.

14. The system as claimed in claim 11, wherein the non-electric power plant comprises an internal combustion engine.

15. The system as claimed in claim 11, wherein the electric power plant is an electric motor.

16. The system as claimed in claim 11, wherein the first coupling assembly comprises a three-position linear actuator and a pair of clutches and wherein the actuator controls the pair of clutches.

17. The system as claimed in claim 11, wherein the second coupling assembly comprises a three-position linear actuator and a pair of clutches and wherein the actuator controls the pair of clutches.

18. The system as claimed in claim 11, wherein the third coupling assembly comprises a three-position linear actuator and a pair of clutches and wherein the actuator controls the pair of clutches.

19. The system as claimed in claim 11, wherein the modes comprise an EV mode, a hybrid mode and an ICE mode.

20. The system as claimed in claim 19, wherein the hybrid mode has a plurality of CVT states when the first coupling assembly is in its uncoupling state.

* * * * *